D. F. GREEN.
REEL.
APPLICATION FILED DEC. 15, 1915.
1,264,636.
Patented Apr. 30, 1918.
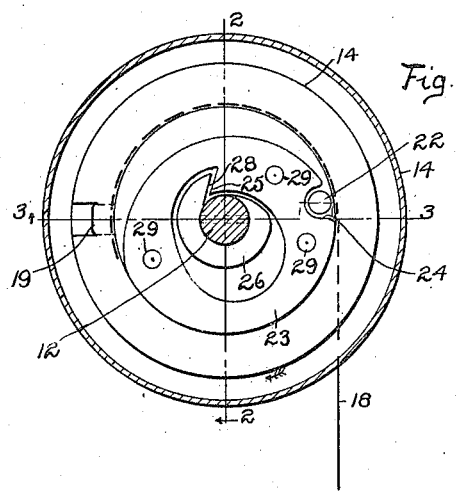
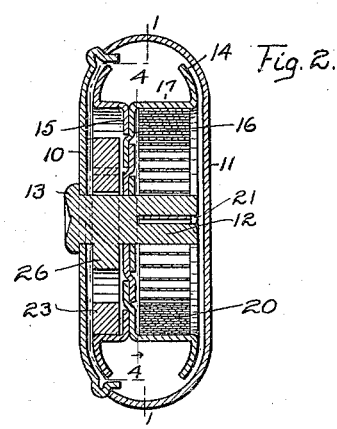
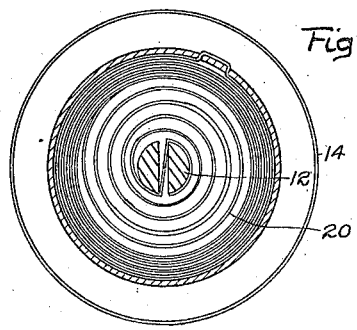
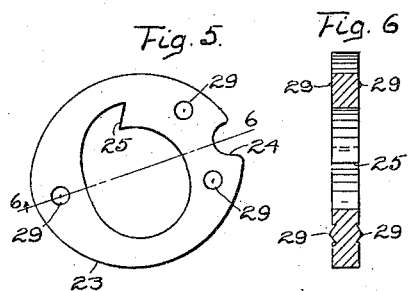
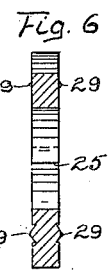
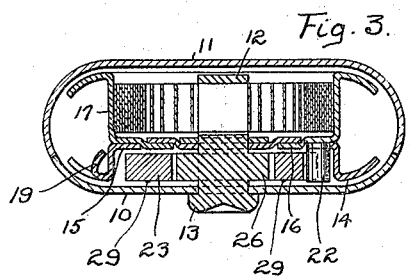
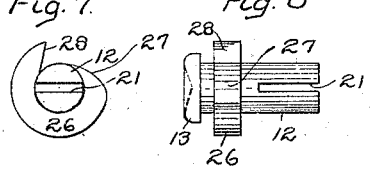
INVENTOR.
Dallas F. Green
BY Taylor & Hulse
ATTORNEYS.

_UNITED STATES PATENT OFFICE._

DALLAS F. GREEN, OF FORT WAYNE, INDIANA.

REEL.

1,264,636.   Specification of Letters Patent.   Patented Apr. 30, 1918.

Application filed December 15, 1915. Serial No. 66,895.

*To all whom it may concern:*

Be it known that I, DALLAS F. GREEN, a citizen of the United States, residing at Fort Wayne, in the county of Allen and State of Indiana, have invented new and useful Improvements in Reels, of which the following is a specification.

The invention relates to certain improvements in reels and the object of the invention is to produce a novel pawl for the reel which will be cheap of construction and positive in its operation.

The invention consists in certain constructions, combinations and arrangements of parts more fully described hereinafter in their preferred form and illustrated in the drawings and as more fully pointed out in the claims.

Referring to the drawings Figure 1 is a cross-section of a device constructed according to my invention taken on line 1—1 of Fig. 2; Fig. 2 a cross-section on line 2—2 of Fig. 1; Fig. 3 a cross-section on line 3—3 of Fig. 1; Fig. 4 a cross-section on line 4—4 of Fig. 2; Fig. 5 a plan view of the pawl carrier; Fig. 6 a cross-section on line 6—6 of Fig. 5; Fig. 7 an elevational view of the pawl stop and Fig. 8 a side view of the pawl stop.

In the drawings I illustrate the application of my invention to eye glass reels. 10 is the back of any form of case which will be provided with a suitable pin for securing it to the clothing of the wearer, and 11 the front which is removably secured to the back. A shaft 12 is fixed to or in the back, the drawings showing the shaft extending through an opening in the back and having a head 13 at its rear end which is pressed into engagement with the back by a suitable tool. The reel or drum 14 is formed in any suitable manner, but it is preferably formed of a series of disks 15, 16 which are suitably secured together, the outer portions of each disk being flanged or flared laterally and outwardly to form a chain space 17 on the periphery of the disks and also spring and pawl-carrier spaces on opposite sides of the disks. Suitable apertures are provided in the disks through which shaft 12 is extended and upon which shaft the reel drum is revoluble. A cord or chain 18 is secured at one end to the clip 19 which is cut out of the outwardly turned portion of one of the disks and bent inwardly therefrom. A coiled spring 20, in the spring space, is secured at its inner end to shaft 12 by projecting it through slot 21 in the shaft and bending the material over the surface of the shaft. The other end of the spring is suitably secured to the reel at the base of the chain space.

On the opposite side of the disks a pin or stop post 22 projects from the disks into the pawl-carrier space. A pawl-carrier 23 is mounted to swing in this space. It may be stamped out of or otherwise formed from thin material, its outer peripheral edge being substantially an ellipse, a notch 24 being provided at one end of the longer diameter of the ellipse. The carrier is engaged at its notched end upon stop post 22, the engagement being very loose so that the carrier will be capable of easy swinging in a vertical plane. The central portion of the pawl-carrier is cut out to provide pawl 25 and to accommodate stop member 26 which member is rigidly mounted on shaft 12. Substantially the lower half of stop member 26 is circular in outline and its upper edge is somewhat flattened to provide a cam 27, the member being extended upwardly at said edge to provide a stop proper 28. The central cut-out portion of the pawl-carrier is similarly shaped in outline, but it is larger in certain directions than the stop member in order that the carrier may freely swing about the member as the reel is rotated and enable pawl 25 to clear stop 28. The weight of the material in the pawl-carrier, which is below the pawl will cause the pawl to drop into contact with the stop when the reel is at rest with the cord or chain withdrawn.

It is to be noted that the pawl carrier is of a length substantially equal to the diameter of the pawl carrier space so that the peripheral wall of that space, formed by the flange on disk 15, provides a stop against which the end of the pawl carrier opposite notch 24 abuts or contacts when the revolution of the drum has been slowed up or has ceased, thereby insuring the engagement of the pawl 25 and stop 28.

The carrier is also provided at suitable points in its surface with raised portions 29 which may be provided in it by a suitable tool. These points 29 prevent the pawl carrier from making contact over its entire surface with the disks or the back thereby securing easy lubrication of the carrier without danger of causing the carrier to adhere to the back or disks.

When the cord or chain is drawn outwardly, that is, it is unwound, drum 14 is rotated on shaft 12 in the direction of the arrow (Fig. 1), and spring 16 is wound up. Stop post 22 being secured to the drum carries pawl carrier 23 with it as it travels about shaft 12 and a portion of the wall of the cut-out portion in the central part of the pawl carrier contacts with the peripheral face of the fixed stop member 26 and slides on said face. The cam surface on the stop and the said elongated cut-out portion cause the pawl carrier to swing in the pawl carrier space so as to cause the pawl 25 to pass over the stop 28. When the draft on the cord or chain is checked spring 16 will tend to rotate the drum and stop post 22 in the opposite direction. Pawl carrier 23, if pawl 25 has passed stop 28, will instantly drop in to contact with the lower portion of the horizontal flange of the drum which forms the peripheral wall of the pawl carrier space, and the pawl is brought into contact with stop 28 as the pawl carrier is backed up by the winding up movement of the drum. As soon as the pawl abuts the stop the drum is positively locked since the peripheral wall of the pawl carrier space and the stop post 22 prevent all further movement of the pawl carrier. To wind up the cord or chain it is only necessary to pull out the same a short distance until the pawl carrier is moved about stop 28 to cause pawl 25 to be clear of the stop whereupon the draft on the chain or cord is released and the centrifugal force of the pawl carrier, as spring 16 drives the drum and carrier, maintains the path of the pawl above the stop.

The eye glass reel described herein, when produced according to my invention, need be no larger than a dime in diameter, and the construction of the pawl and its action as described is very effective in this small reel.

It is apparent that the pawl action described may be applied to numerous rotating devices in which it is desirable or necessary to temporarily retain the rotating element in a fixed position.

What I claim is:

1. The combination with a shaft having a stop member thereon, of a revoluble member on the shaft, a stop projecting laterally from the revoluble member, a pawl carrier having a pawl for engaging the stop member on the shaft and having a notch in its edge for peripheral fulcrumage with the stop on the revoluble member, and means on the revoluble member against which the edge of the pawl carrier substantially diametrically opposite the notch is adapted to abut.

2. The combination with a shaft having a stop member thereon, a revoluble member on the shaft, a pawl carrier encircling the stop member and having a notch in its periphery, a pawl on the pawl carrier adapted to engage the stop member, a cam on the stop member adapted to separate the pawl and stop when the revoluble member is rotated, and a stop post projecting from the revoluble member and loosely contacting a wall of the notch.

3. The combination of a shaft, a stop member fixed to the shaft, a revoluble member on the shaft having a recessed face, a stop projecting laterally from the revoluble member into the recessed portion thereof, and a pawl carrier peripherally and loosely contacting with the stop and having a pawl for engagement with the stop member on the shaft, the edge of the pawl carrier having stopping contact with the peripheral wall of the recessed portion of the revoluble member.

4. The combination of a shaft, a stop member fixed on the shaft, a recessed revoluble member on the shaft, a stop projecting from the revoluble member into the recessed portion thereof, a pawl carrier adapted to contact with the inner peripheral wall of the recessed portion of the revoluble member, and having a notch in its periphery for loose peripheral fulcrumage contact with the stop on the revoluble member and a pawl on the pawl carrier adapted to engage the stop on the shaft.

In witness whereof I hereunto subscribe my name this 12th day of October, 1915.

DALLAS F. GREEN.